United States Patent [19]

Boller et al.

[11] B 3,914,180

[45] Oct. 21, 1975

[54] GLASS CUTTING FLUID

[75] Inventors: Thomas E. Boller, Southfield; Salvatore Guerra, Melvindale, both of Mich.

[73] Assignee: Ford Motor Company, Dearborn, Mich.

[22] Filed: May 4, 1973

[21] Appl. No.: 357,402

[44] Published under the Trial Voluntary Protest Program on January 28, 1975 as document no. B 357,402.

[52] U.S. Cl. ...................... 252/58; 252/11; 252/15
[51] Int. Cl.² ........................................... C10M 1/30
[58] Field of Search .......... 252/11, 15, 58, 68; 83/6, 83/22, 168

[56] References Cited
UNITED STATES PATENTS

| | | | |
|---|---|---|---|
| 1,857,235 | 5/1932 | Burton | 252/11 |
| 2,449,114 | 9/1948 | Gebauer | 252/15 |
| 3,037,932 | 6/1962 | Barker | 252/15 X |
| 3,129,182 | 4/1964 | McLean | 252/58 X |
| 3,169,928 | 2/1965 | Herold | 252/68 |
| 3,461,755 | 8/1969 | Gerew et al. | 83/169 |
| 3,664,956 | 5/1972 | Messina et al. | 252/58 |

*Primary Examiner*—W. Cannon
*Attorney, Agent, or Firm*—William E. Johnson; Keith L. Zerschling

[57] ABSTRACT

A fluid for use in a glass cutting operation contains two portions. A first portion of the fluid is a highly volatile, non-residue forming, cutting tool lubricant. The second portion of the fluid is a non-volatile material either dissolved in or carried by the tool lubricant. The non-volatile material is one which forms an encapsulating film along a score placed on a glass surface by a glass cutting tool. This film binds any wing chips to the edge of the score to prevent spalling.

2 Claims, No Drawings

GLASS CUTTING FLUID

BACKGROUND OF THE INVENTION

The end product of a float glass manufacturing process is a glass ribbon having a predetermined width and an infinite length. The glass ribbon produced is cut across its width to produce glass brackets. Other glass sizes are cut from the brackets. The cutting of the glass ribbon or brackets is generally accomplished by automatic glass cutting equipment. Such cutting equipment employs glass cutting tools which are moved across the surface of the glass to place a cutting score on the surface of the glass.

As a glass cutting tool is moved across the surface of the glass, it is generally necessary to apply a lubricant to the cutting tool for the purpose of lubricating the cutting wheel and axle and the glass. One cutting fluid known in the art is methyl chloroform. This particular fluid is trickled slowly down onto the glass cutting tool as the tool moves across a glass surface. Methyl chloroform is a highly volatile liquid and after its application to the cutter tool and possible transfer to the surface of the glass being cut, it volatilizes into the ambient. Since the lubricant volatilizes, there is no need to wash the cut glass to remove the cutting fluid.

A major disadvantage of using the above described type of glass cutting fluid is that much spalling from the score line on the glass occurs. The spalling is in the form of wing chips which are minute chips developed when wing fissures are run out from the main fissure developed in the glass by the glass cutting tool. While the wing fissures that develop may be extremely minute and hard to detect, they cause problems in subsequent glass finishing operations. For example, when the individual brackets are stacked one against the other in a stacking operation, wing chips may scratch the surface of the stacked sheets during stacking or unstacking thereof. The wing chips may also cause such defects as bullseyes and scratches in the fabrication of the glass into body glass or windshields for motor vehicles.

SUMMARY OF THE INVENTION

This invention relates to an improved glass cutting fluid and method of utilizing the same and, more particularly, to an improved glass cutting fluid and method of utilizing the same which reduces spalling of wing chips generated in an area of a score on a glass surface.

In accordance with the general teachings of this invention, a fluid is used in a glass cutting operation both as a lubricant for a glass cutting tool and to reduce spalling of the glass. The fluid contains the following ingredients. A high volatile, non-residue forming, cutting tool lubricant forms from 70 to 97 percent by volume of the fluid. The second ingredient is 30 to 3% by volume of a non-volatile material either dissolved in or carried by the tool lubricant. The non-volatile material is one which forms a solid or liquid encapsulating film along both sides of the score which acts to bind any generated wing chips to the edge of the score. The fluid may also act to prevent wing chip propagation and the formation of wing chips. This binding of the wing chips to the edge of the score prevents spalling. The tool lubricant and the non-volatile material is preferably organic based and soluble in one another. A small amount of an emulsifying agent may also be added to enhance the water washability of the non-volatile material.

The method of cutting glass with this fluid includes the following steps. A relatively viscous oil is dissolved in a solvent to form a mixture. The solvent is a highly volatile material which also acts as a cutting tool lubricant. A continuous but small amount of the mixture is applied in the glass cutting operation to a glass cutting tool as the tool moves along the glass surface. The mixture is carried to the area of the score on the glass surface by the glass cutting tool. The solvent of the mixture is vaporized whereby a small residue of the viscous oil remains behind along the path of the score. The viscous oil is effective to prevent spalling. A small amount of an emulsifying agent may be included in the mixture in order to make the viscous oil more easily washable from the surface. The major advantage of a volatile cutting fluid is maintained because the quantity of residue is minimized and contained on the score. Thus, glass washing can still be avoided.

DESCRIPTION OF THE PREFERRED EMBODIMENT

There will be illustrated herein preferred examples of glass cutting fluids of this invention and method of using the same. The specific illustrations, however, are not intended to be a limitation upon the breadth of applicants' invention. Generically the invention taught herein is one in which a volatile solvent, which serves as a cutting tool lubricant, carries therein a non-volatile material which forms a solid or liquid encapsulating film along a score placed on the surface of a glass sheet after the solvent has volatilized. The cutting fluid may also contain a small amount of an emulsifying agent which aids in the washability of the non-volatile material.

EXAMPLE 1

A solution is formed which contains 95.0 percent by volume methyl chloroform 4.96 percent by volume Vacuml by volume (Vacmul being a paraffin based oil generically classed as a hydrocarbon oil) and Triton X–207 0.4 percent by volume (Triton X–207 being an alkyl aryl polyether alcohol) serving as an emulsifying agent. This mixture is thoroughly agitated to produce a homogeneous solution.

The homogeneous solution is slowly, but continuously, applied to a cutting wheel placing a cutting score on a glass ribbon in a glass cutting operation. The mixture flows down on the cutting wheel and lubricates the same during the cutting operation. By lubrication we mean that the material reduces wheel-axle and wheel-glass friction for the cutting wheel. A portion of the mixture is transferred by the cutting wheel and applied along the edges of the socre. The glass scoring tool develops a main fissure perpendicular to the glass surface which subsequently is propagated to produce the cut through the glass. The cutting tool may also develop wing fissures which can spread out arcuately from the point of score and subsequently can be propagated to return to the surface of the glass ribbon and form a wing chip.

As above described, the glass cutting fluid is transferred and applied along opposite edges of the score. As the cutting wheel transfers the glass cutting fluid to the position along the score, the methyl chloroform vaporizes leaving behind the Vacmul. This heavy oil is deposited as a thin film along the lateral edges of the score. The thin film serves as an encapsulating film which retards wing chip formation and binds any wing chips to the glass itself. The wing chip is not allowed to pop up from the glass surface because of the deposited film thereover. Thus, the wing chip does not become available for subsequently damaging the glass surface. If desired the wing chip may be washed away with the deposited film in a washing operation.

EXAMPLE 2

A mixture containing 75 percent by volume of Freon which is trichlorotrifluroethane, is mixed with 25 percent by volume of Humble SK–596 oil diluted on a 4 to 1 basis with kerosene. The Humble SK–596 oil is paraffin based oil.

The mixture above described is deposited upon a glass surface during a glass cutting operation as described in Example 1. The same reduced spalling is noted because of wing chip adhesion to the glass surface by this material. In this case the Freon volatilizes and the oil serves as the encapsulating film.

In accordance with some of the general teachings of this invention, the highly volatile, non-residue forming cutting tool lubricant may be included in the mixture from 70 to 97 percent by volume. The non-volatile material may be included in the fluid from 30 to 3 percent by volume. Up to about 0.75 percent by volume in the non-volatile oil of an emulsifying agent may be added. The non-volatile material may have a viscosity ranging from about 35 seconds to about 200 seconds.

There has been disclosed herein a method of and a cutting fluid for a glass cutting operation. In view of this specification, those skilled in the art will have many modifications which fall within the true spirit and scope of this invention. It is intended that all such modifications be within the scope of the appended claims.

We claim:

1. A fluid for use in a glass cutting operation wherein the fluid acts to lubricate the glass cutting tool and to reduce spalling of the glass at the score therealong, which fluid comprises: 70 to 97 percent by volume of methyl chloroform which acts as a cutting tool lubricant, and 30 to 3 percent by volume of a hydrocarbon oil of lubricating viscosity in said methyl chloroform.

2. The fluid of claim 1 further including: a small amount of an emulsifying agent.

* * * * *